US008332266B2

(12) United States Patent
Doeberl et al.

(10) Patent No.: US 8,332,266 B2
(45) Date of Patent: Dec. 11, 2012

(54) SYSTEM AND METHOD FOR MANAGING BUSINESS MACHINE ASSETS

(75) Inventors: Terrence M. Doeberl, West Redding, CT (US); Paul E. Duedall, Palm Bay, FL (US); Mark E. Hogan, Melbourne Beach, FL (US); John D. Goldson, Palm Bay, FL (US)

(73) Assignee: Pitney Bowes Inc., Stamford, CT (US)

( * ) Notice: Subject to any disclaimer, the term of this patent is extended or adjusted under 35 U.S.C. 154(b) by 2667 days.

(21) Appl. No.: 10/709,230

(22) Filed: Apr. 22, 2004

(65) Prior Publication Data
US 2004/0249655 A1    Dec. 9, 2004

Related U.S. Application Data

(60) Provisional application No. 60/464,947, filed on Apr. 23, 2003.

(51) Int. Cl.
*G06Q 50/00*   (2012.01)
*G06F 17/60*   (2006.01)
(52) U.S. Cl. .............................................. 705/8; 705/28
(58) Field of Classification Search ....................... 705/8
See application file for complete search history.

(56) References Cited

U.S. PATENT DOCUMENTS 6,952,680 B1 * 10/2005 Melby et al. ..................... 705/28
7,315,887 B1 * 1/2008 Liang et al. .................... 709/223

* cited by examiner

*Primary Examiner* — Garcia Ade
(74) *Attorney, Agent, or Firm* — George M. Macdonald; Charles R. Malandra, Jr.; Steven J. Shapiro

(57) ABSTRACT

Systems and methods for managing business machine assets are described. In one configuration, the system analyzes alternate placement structures and provides for alternate asset model placement suggestions.

2 Claims, 9 Drawing Sheets

| Volume | Brand\Model | Current Model BaseCost | ClickCost | Target Vol | Brand | Preferred Replacement Model Model | BaseCost | ClickCost | Target Vol | Potential Savings |
|---|---|---|---|---|---|---|---|---|---|---|
| 34,461 | Canon 6050 | 1,500.00 | 516.77 | 90,000 | Canon | 6051 | 2,000.00 | 85.27 | 90,000 | (68.50) |
| | NOTE: AssetTag 9116602 uses CPC: 0.01500 and Preferred Replacement uses Default Volume Band: Digital C1221E | | | | | | | | | |
| 37,052 | Canon 6050 | 1,500.00 | 665.78 | 90,000 | Canon | 6051 | 2,000.00 | 97.88 | 90,000 | (42.10) |
| | NOTE: AssetTag 9116603 uses CPC: 0.01500 and Preferred Replacement uses Default Volume Band: Digital C1221E | | | | | | | | | |
| 49,156 | Canon 6050 | 1,500.00 | 737.34 | 90,000 | Canon | 6051 | 2,000.00 | 148.40 | 90,000 | 88.94 |
| | NOTE: AssetTag 9116604 uses CPC: 0.01500 and Preferred Replacement uses Default Volume Band: Digital C1221E | | | | | | | | | |
| 62,989 | Canon 6050 | 1,500.00 | 944.84 | 90,000 | Canon | 6051 | 2,000.00 | 208.33 | 90,000 | 236.51 |
| | NOTE: AssetTag 9116606 uses CPC: 0.01500 and Preferred Replacement uses Default Volume Band: Digital C1221E | | | | | | | | | |
| 36,504 | Canon 6050 | 1,500.00 | 647.56 | 90,000 | Canon | 6051 | 2,000.00 | 106.39 | 90,000 | (57.83) |
| | NOTE: AssetTag 9116607 uses CPC: 0.01500 and Preferred Replacement uses Default Volume Band: Digital C1221E | | | | | | | | | |
| 41,874 | Canon 6050 | 1,500.00 | 828.11 | 90,000 | Canon | 6051 | 2,000.00 | 125.17 | 90,000 | 2.94 |
| | NOTE: AssetTag 9116609 uses CPC: 0.01500 and Preferred Replacement uses Default Volume Band: Digital C1221E | | | | | | | | | |
| 39,926 | Canon 6050 | 1,500.00 | 598.89 | 90,000 | Canon | 6051 | 2,000.00 | 116.45 | 90,000 | (17.56) |
| | NOTE: AssetTag 9116610 uses CPC: 0.01500 and Preferred Replacement uses Default Volume Band: Digital C1221E | | | | | | | | | |
| 45,446 | Canon 6050 | 1,500.00 | 681.09 | 90,000 | Canon | 6051 | 2,000.00 | 127.38 | 90,000 | 54.33 |
| | NOTE: AssetTag 9116612 uses CPC: 0.01500 and Preferred Replacement uses Default Volume Band: Digital C1221E | | | | | | | | | |
| 41,804 | Canon 6050 | 1,500.00 | 827.06 | 90,000 | Canon | 6051 | 2,000.00 | 122.45 | 90,000 | 4.61 |
| | NOTE: AssetTag 9116617 uses CPC: 0.01500 and Preferred Replacement uses Default Volume Band: Digital C1221E | | | | | | | | | |

FIG. 11

SYSTEM AND METHOD FOR MANAGING BUSINESS MACHINE ASSETS

CROSS REFERENCE TO RELATED APPLICATIONS

This application claims priority under 35 U.S.C. section 119(e) from Provisional Patent Application Ser. No. 60/464,947, filed Apr. 23, 2003, entitled Method and System for Managing Business Assets, which is incorporated herein by reference in its entirety.

COPYRIGHT STATEMENT

A portion of the disclosure of this patent document contains material which is subject to copyright protection. The copyright owner has no objection to the facsimile reproduction by any one of the patent document or the patent disclosure, as it appears in the Patent and Trademark Office patent files or records, but otherwise reserves all copyright rights whatsoever.

BACKGROUND OF INVENTION

The illustrative embodiments described in the present application are useful in systems including those for managing assets and more particularly are useful in systems including those for managing asset lifecycle for an enterprise including procurement, tracking and assignment, service, activity, billing and reporting for assets such as fleets of business machines including copiers, printers and mailing machines.

Many companies purchase business machines such as output devices including printers in a haphazard fashion in which users request printers from the Information Technology (IT) department. The company may have an IT budget per organization, but may not study organization usage and life cycle management. Such strategies are based upon individual need at a point in time and may not consider changes to those needs over time and when making future purchase decisions. In such environments, half of the output devices may be underutilized and a quarter may be over-utilized.

Companies typically spend between one and three percent of gross revenue on printing costs. About 20 percent of that cost includes office printing, copying and faxing. A company may have one printer per 4 employees and one copier per 50 employees. Progressive cost-conscious companies may perform a static rightsizing analysis in which output devices are strategically distributed across the enterprise. Such static analysis may be expensive to complete and require productivity savings over time to produce a return on investment for the analysis.

Certain companies utilize capital asset management software applications such as those available from Peregrine or Main Control. Such systems may not support usage recording or user-based cost accounting. Additionally, such systems may not support management of many client fleets using either an on-site decentralized basis or a centralized, cross-client basis.

SUMMARY OF INVENTION

The present application describes systems and methods for managing assets. In at least one embodiment, the asset management system provides comparison data relating to current models of assets and usage patterns against potential replacement asset models and forecast usage patterns. In one embodiment, the assets include office copiers and the system receives current asset data and potential replacement asset data including base cost information, click cost information and actual and/or target copy volume. The comparison data includes potential savings data.

In another embodiment, the above functions are included in a comprehensive system including a system for asset management supporting equipment replacement and movement using equipment utilization analysis, equipment comparison analysis and optimization analysis.

BRIEF DESCRIPTION OF DRAWINGS

FIGS. 7-10 are screen views illustrating billing scenarios according to an illustrative embodiment of the present application.

FIG. 11 is a table illustrating an asset replacement report according to an illustrative embodiment of the present application.

DETAILED DESCRIPTION

Figure 1:
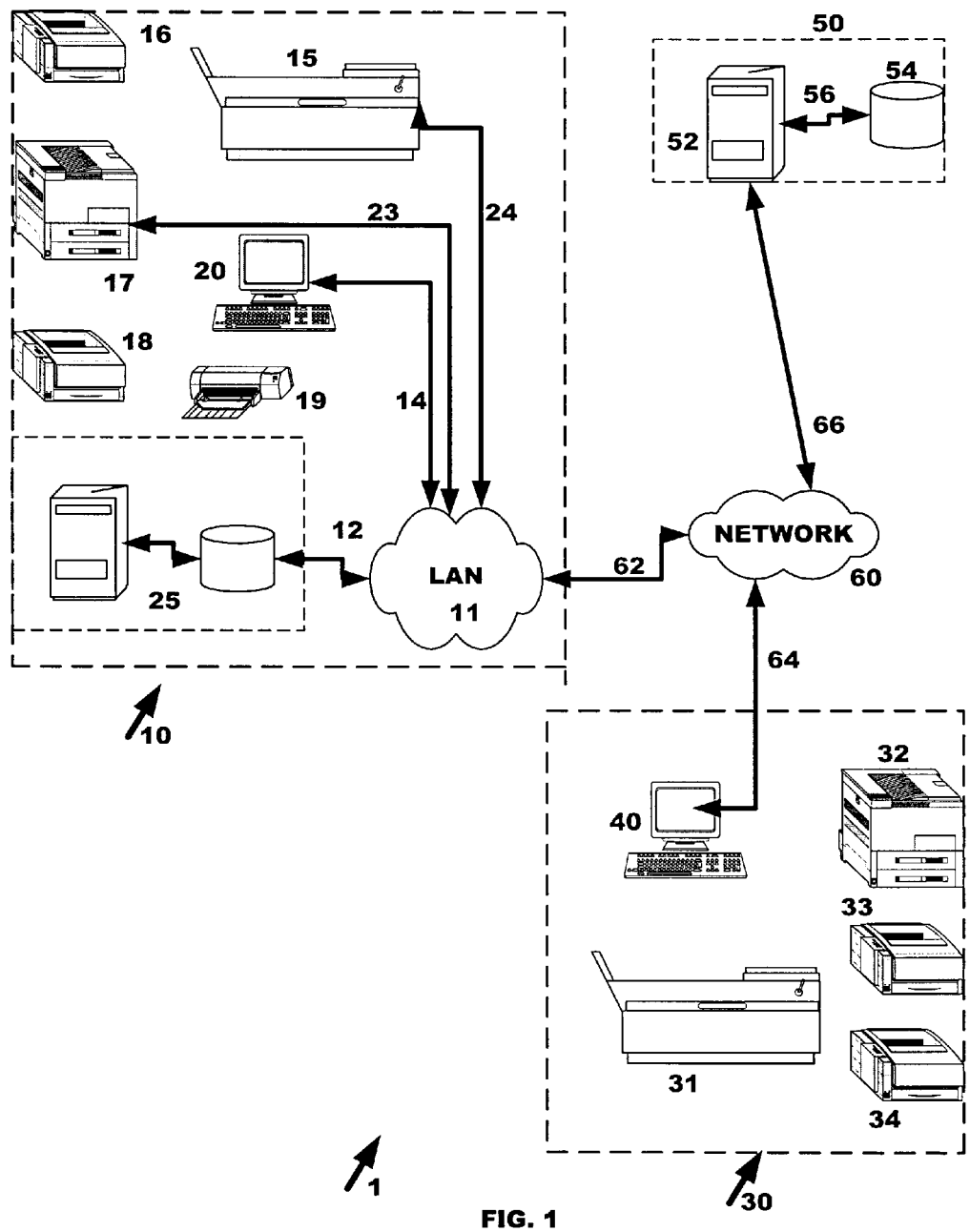
FIG. 1 is a schematic representation of an illustrative system including representative components including business machines and Asset Management systems according to an illustrative embodiment of the present application.

Certain companies outsource printer, copier and other business machine operations. For example, certain companies hire an outsource provider to manage a fleet of business machines. Business machines include copiers, facsimile machines, printers, multifunction machines, scanners, computers, mailing machines and other devices. The management processes may include procurement, maintenance and all life cycle management issues. The outsource customer companies may purchase the business machines. Such companies may also lease equipment from the management intermediary or may allow the intermediary to manage leases with equipment vendors and service agreements with maintenance providers. Similarly, the managing intermediary may be responsible for purchasing and managing any required supplies.

Output device acquisition options include purchase, lease, click-charge and usage-based solutions. Certain output device manufacturers offer usage based solution packages based upon the use of that companies output devices, supplies and service. Consumables may be optionally included in a solution package. Certain other companies may integrate competitor products that existed at the client site when the usage-based solution was implemented.

Accordingly, it may be disadvantageous to utilize inaccurate and labor intensive manual accounting processes for usage and device tracking, particularly when managing larger dynamically changing fleets of business machine assets.

In one embodiment, the asset management system described supports outsourced management of many client fleets so that consistent business processes and standards may be applied across a broad client base in a cost effective manner on either an on-site, decentralized basis or on centralized, cross-client bases. The system provides for automatically tracking the entire asset lifecycle and for recording all actions taken in managing the asset. The system manages equipment procurement, physical movement, financial movement, service management, activity tracking, equipment utilization analysis and optimization, print/copy usage meter reading, usage data collection, multiple pricing/billing model support and detailed customer and internal management reporting. In at least one embodiment, the asset management system provides for integration with third party e-commerce and networked device output data collection systems in order to streamline both equipment and supplies procurement processes and to automate usage data collection.

The illustrative Asset Management System described includes at least one Dell server using Microsoft SQL 2000 relational database software, Crystal Reports from Seagate and code written in Borland Delphi. The Asset Management System is a software system designed to manage all aspects of output device fleet management for large corporations. The client system is a thick client application that interacts with a server executing the Asset Management System for a group of clients. Alternatively, a thin client may be utilized incorporating a Java interface.

The illustrative server is centralized and may optionally be load balanced. The server utilizes a separate database for each client, or may also utilize a single database for multiple clients. Alternatively, the server may be on-site for a customer, near site at a site nearby the customer site or remote. Alternatively, a client may have a private version of the Asset Manager.

The Asset Management System integrates a call center function, asset tracking function, contract tracking, compliance and planning function, a cost function, a tax function, consumables tracking and compliance function and a service level function. The System maintains a database using Microsoft SQL 2000 that includes device parameters for a client site. For example, each asset is assigned a primary key named the asset tag that is unique across the entire universe of managed systems. Consequently, the Asset Manager System can export data to another system such as a billing system without requiring a second key to uniquely identify an asset. Alternatively, the System provides an asset tag that is only unique for a particular customer or site and then uses additional keys such as the customer identifier to identify the asset. In another alternative, the database may utilize device serial number to identify an asset in conjunction with other keys.

Because it is possible that a business machine vendor may not issue unique serial numbers, the system can ensure unique identification of a business machine by assigning a unique identifier to each business machine. Since the system may be distributed, techniques for ensuring the uniqueness of asset tags may include a centralized issuing authority or an asset tag that incorporates information unique to a site such as a customer identifier. The unique identifier may incorporate client data or even manufacturer data such as a manufacturer identifier or number.

The database includes a hierarchal location structure for the business machines so that geographic information can be considered. The customer, site, building, floor and room number or other location data is included in the database. Furthermore, an organizational tree is included in the database so that particular departments or users can be identified in relation to the hierarchal location structure. The physical and departmental organization for a site, campus and enterprise level of a customer organization can be stored and viewed using a Graphical User Interface (GUI).

The database maintains such physical location information and also maintains financial information. For example, the database stores data for charging back expenses. A department may be responsible for the cost or two or more departments may apportion the costs.

The Asset Manager System may acquire data while performing functions such as procurement management. In such cases, data regarding the asset is captured during procurement. Certain asset data may be input during a new client import. For example, data relating to existing assets may be entered into the system. In one embodiment, Microsoft Excel templates are utilized to capture device parameters. For example, a Microsoft Excel template may be generated periodically and may be generated according to the physical locations of devices along a route such as an internal mail delivery route. Accordingly, mail delivery personnel can capture business machine usage data while delivering mail using a template that lists the machines in the order that they are encountered along the route. A machine may include multiple meters that may distinguish between parameters such as color and monochrome pages printed. If a machine is moved, the template is redefined. Thereafter, a data entry operator transcribes the data into the system. Known techniques such as redundant data entry operations can be used to ensure accuracy. Data files created using the templates may be transported using email or other known file transfer methods. They may then be uploaded into the Asset Manager database.

Consumable usage may similarly be tracked using a template. The mail delivery personnel could take toner inventory and enter the data on the template form. Alternatively, the consumable usage may be separately recorded by a technician periodically such as daily from a log carried during toner change calls.

In an alternative, the data input technician is issued a handheld computer such as a PDA with wireless connectivity and a bar code reader. The business machines at the site have an asset tag bar code or other identifier that is used to identify the business machine. The data input technician, scans the asset bar code tag and the PDA requests information pertinent to that machine, such as the meter reading for a copier. In another alternative, the PDA informs the technician whether data is required for a particular business machine along a known route such as the internal mail delivery route.

In another alternative, a machine Management Information Base (MIB) is captured that includes usage information, an error log, a make, model and serial number and a rolling meter count of pages printed. The device may have another unique identifier such as a network MAC address.

In another alternative, data input is captured from business machine accounting systems such as those available from Equitrax. In such systems, the Asset Manager may capture client/matter or department utilization as well. For example, department utilization is cross-referenced with device geographical information in a report. Additionally, in such an alternative, the department charge-back information may be based upon actual click counts rather than a preset percentage.

The Asset Manager System calculates toner yield based upon the usage meter readings and toner change records in order to determine whether a particular asset met the anticipated toner yield. If the toner yield is not met, a report is generated and the site manager may decide to make a claim for a refund from the toner manufacturer. The system maintains manufacturer data and distributor data so that manufacturer trends, distributor or lot trends may be tracked.

The Asset Manager System optionally captures and track child assets as they are moved from parent to parent or added to a parent. For example, a computer may have a faulty disk drive that is swapped. The parent asset tracking number may be associated with child asset numbers that may be changed over time.

The System also provides the ability to estimate meter readings and may utilize configurable contract rules for the calculation. For example, an average monthly usage over the prior three months may be used as an estimate. Several systems for monitoring consumable supply levels and ordering consumable supply replacements have been described. For example, U.S. Pat. No. 5,305,199 entitled Consumable Supplies Monitoring/Ordering System for Reprographic Equipment issued to LoBiondo, et al. on Apr. 19, 1994. U.S. Pat. No. 6,275,664 B1 entitled Predicting Supplies Required for Completion of Unattended Print Jobs issued to Wolf, et al. on Aug. 14, 2001. U.S. Pat. No. 6,529,692B1 entitled Consumable Order-Assistance System for Computer Peripheral Device Within a Single Connection Environment and Method for Replenishing Consumables issued to Haines, et al. on Mar. 4, 2003. The above referenced patent documents are incorporated herein by reference in their entirety. Such systems attempt to assist in determining when supplies need to be ordered.

However, consumables may be removed from local stockpiles without authorization. For example, reams of paper or toner cartridges may be expropriated from the supply storage areas or ordered more frequently than actually used. Additionally, a particular customer may purchase only a percentage of consumables from the business machine asset management company.

In an embodiment, the Asset Manager compiles current and historical usage data for each asset being managed. The system also obtains consumable data such as information relating to when each toner is changed and the type of the toner. Other consumables such as paper, fusers, and drums can be tracked.

In another embodiment, the system considers location information and nearby like device information. Certain devices including those with the same or similar model numbers use the same consumables such as toner. An illustrative method to trend and predict output device consumable usages within a localized site, campus, or enterprise environment is described.

The Asset Management System maintains information regarding all output device models used within the customer's environment, including the type of consumables used. The system maintains information relating to the consumables used with each of these models. For example, acceptable consumables from several manufacturers may be applicable. Furthermore, consumables such as toner cartridges may be available with different amount of toner included. For example, a particular printer may be available with a toner rated at 5,000 pages or 10,000 pages. The predicted capacity of each consumable is typically based on the amount of pages (per-page or clicks) that can be successfully processed. Such predictions are typically based upon models of typical toner coverage per page over a set or subset of document types. Of course, the actual document page coverage printed will affect the actual toner usage. Certain users will have usage patterns that differ widely from the computed predicted values of toner usage.

The system also provides a Consumable Module to maintain the consumable purchases for each asset. The system may also maintain a consumable inventory for an asset or group of assets. The inventory may be based upon location as well and may include an enterprise or subset of an enterprise such as a department.

Additionally, consumable requests can be managed through the Incident Module that tracks service and maintenance calls. For a customer that does not manage consumables through the system, the Asset Manager can predict the amount of consumables that the customer should be using and provide a report of such predicted usage. A salesperson may then use those reports in an attempt to sell consumables to the customer.

Using the previously defined historical device usages, the system can trend the predicted consumable usage with the actual consumable purchases. For example, a customer may be purchasing only a percentage of consumables from the business machine asset management company. The consumable data may be organized by model type, consumable type, department or other organizational group or floor or other location set. Accordingly, the system provides for Identification and trending of consumable purchases for specific devices or models as well as Identification and trending of consumable purchases to specific physical locations. The consumables data including consumables purchases can be related to a physical location hierarchy or on a site or enterprise basis.

In an alternative, certain customers pay for business machine services purely by pages printed or other metrics. In such cases, all required consumable may be included in the customer contract. Accordingly, the Asset Manager system tracks the cost of consumables used to enable efficient management of consumable purchases to contracts by providing relevant reports. The contract price may be adjusted if an extraordinary amount of consumables are used.

In an embodiment, the asset management system provides comparison data relating to current models of assets and usage patterns against potential replacement asset models and forecast usage patterns. In one embodiment, the assets include office copiers and the system receives current asset data and potential replacement asset data including base cost information, click cost information and actual and/or target copy volume. The comparison data includes potential savings data.

In another embodiment, the above functions are included in a comprehensive system including a system for asset management supporting equipment replacement and movement using equipment utilization analysis, equipment comparison analysis and optimization analysis.

With reference to FIG. 1, an illustrative system for managing assets 1 is described. A first representative customer system 10 having illustrative components includes a Local Area Network 11 that is connected to a local Asset Manager Server 25 by Ethernet communications channel 12.

Conventional communications systems and channels are used and appropriate security measures are utilized. Copier 15 is connected to the LAN 11 using communications channel 24. Group printer 17 is connected to the LAN 11 using communications channel 23. An Asset Manager client 20 includes a Dell Pentium 4 PC connected to the LAN using communications channel 14.

Alternatively, other computers and peripherals may be utilized. Standalone laser printers 16 and 18 are representative of printers at the customer site. They are the same model type and are located on the same floor but in different departments of the customer organization. The customer also utilizes Standalone ink jet printer 19. The devices include location and department information.

The first customer system 10 is connected to network 60 using T1 communications channel 62. The network 60 is the Internet. Alternatively, other networks may be utilized.

Centralized Asset Manager system 50 includes a server 52 with storage 54 connected locally by communications channel 56. The server includes a Dell server running Microsoft SQL 2000. Alternatively, the storage is remote and a Unix platform is utilized. The Asset Manager Server 50 is connected to the Network 60 using communications channel 66.

A second representative customer system 30 includes illustrative components. Asset Manager client 40 is connected to the network 60 using communications channel 64. Group printer 32 is a standalone unit as are personal laser printers 33 and 34. Copier 31 is available at the customer site and is also standalone. The devices are located in order 31, 32, 33 and 34 along the mail delivery path for the respective floor at the customer site 30.

Figure 2:
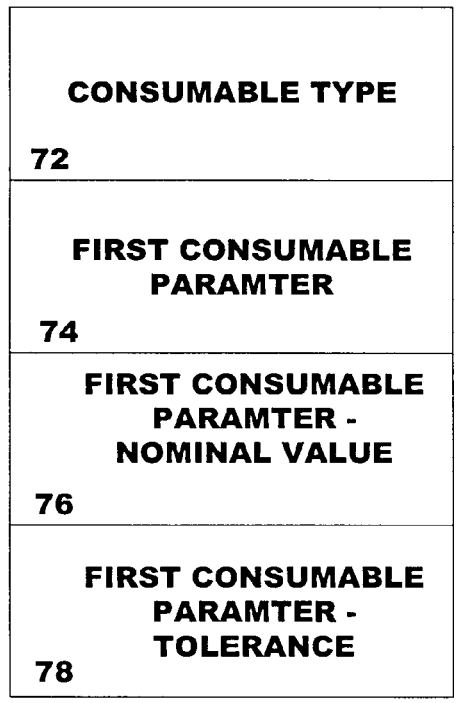
FIG. 2 is a schematic representation of a data record relating to consumables in an Asset Management system according to an illustrative embodiment of the present application.

With reference to FIG. 2, a data record used to trend and predict output device consumable usage is described. A consumable type record 70 includes a consumable type identifier 72 and one or more consumable parameters 74 such as toner amount, target number of page life, low number of page life and high number of page life. The parameter 74 will include a nominal value 76 and tolerance information 78. Additional parameters may be used. Alternatively, a tolerance range may be specified as a percentage or an acceptable range without a target may be specified.

Typical consumable types include many models each of toner, fuser, developer, drum, photo conductor, roller, staples, transfer assemblies, ribbon, ink cartridges, waste recycle containers and sometimes paper.

The consumable types will have associated attributes. For example, a toner cartridge will include a target number of pages and utilization data. The target may also include a tolerable range or percentage tolerance.

A typical toner cartridge for black toner may nominally print 10,000 pages, but have a tolerance of 7,000 through 12,000 pages. Accordingly, if toner usage was not consistent with the meter reads for number of pages printed, a potential fraud flag is asserted.

Figure 3:
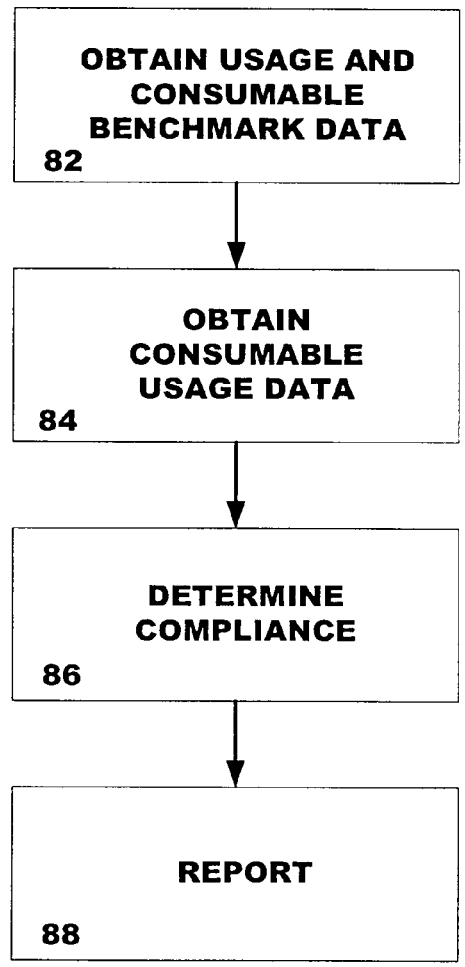
FIG. 3 is a flow chart showing a process for detecting the presence of consumables fraud according to an illustrative embodiment of the present application.

With reference to FIG. 3, an illustrative method to trend and predict output device consumable usage is described.

The consumables monitoring process 80 begins. The user may run the process in a batch mode to process reports or it may be a background process that pushes exception data out to the operator when encountered. In step 82, the process obtains current and historical meter readings or other usage data for the business machine or group of machines under consideration along with benchmark consumable data. The user may select many asset groups including a group of all of one asset type, a group of all asset types using a particular consumable type, a group based upon location criteria such as a particular customer site or floor, a group based upon organizational based criteria such as a department or an individual asset. In step 84, the process obtains information relating to the consumable replenishments such as when the toner of a printer was last changed. The data may be obtained from an Asset Manager purchasing module, an incident help desk module, by manual inventory or other method. Alternatively, inventory data regarding remaining consumables can be input and compared to historical usage data. In step 86, the process determines whether the consumable usage is within tolerance. This compliance step may take into account other factors as discussed below. If not, the process reports the discrepancy in step 88. The reporting step may withhold notification and track potential consumables fraud over time until a confidence level such as 40% out of tolerance or more is reached.

For example, a monochrome group laser printer uses black toner has an expected toner life of 10,000 pages with a tolerance of 10%. During January, 100,000 pages were printed and 14 toner cartridges were ordered. Accordingly, 14 toner cartridges should print at least 9,000 times 14 or 126,000 minimum pages. The usage here is out of tolerance and would be flagged. If the usage was within 10 percent, it would not be flagged, but an aggregated period of two months would later be used to obtain more accurate usage data over a larger statistical sampling. Alternatively, another printer may have printed 100,000 pages, but had only 6 toner cartridges ordered. Such a discrepancy would also be reported. In an alternative, the two printers in question would offset discrepancies and no discrepancy would be reported. In another alternative, potential matching discrepancies such as one printer over consumables and one nearby printer under will be reported. The user can then decide whether an investigation is necessary.

In another alternative, a group of machines are considered together. The group may include the same types of printers on a floor that are in a pool for supplies. If supplies are determined to be missing for a device or group of devices, it is possible that they were moved or utilized in another area. Accordingly, the system also reports potential excess supply inventories. For example, if a printer on a particular floor appears to have not consumed one of the toner cartridges allocated to it, the system may search for a printer on the same floor that appears to have used one less toner than allocated. The report may list the two incidents side by side to determine if they match. The system may also list charge back data for each of the two devices so that a determination can be made whether a charge back department-to-department adjustment should be made.

Similarly, an outsourcing company may wish to track consumables to determine if outside or unauthorized consumables are being utilized. Accordingly, reporting step 88 may be the only step used and it may be used to report predicted usage to a salesperson for follow-up. If a location-based algorithm is used, the system utilizes location information to aggregate predicted consumable usage by type for a particular enterprise or subset of an enterprise such as a site or campus. The predicted consumable usage is then compared against consumable orders over a comparable period of time. A report is formed listing the predicted values against the actual orders and discrepancies beyond a threshold of twenty percent are flagged and highlighted. The threshold value may be changed according to factors such as types of page printing and other factors. For example, a company known to print mostly white-space documents will use less toner than predicted by an average model. Accordingly, a specific model can be developed as needed with feedback from usage data.

Figure 4:
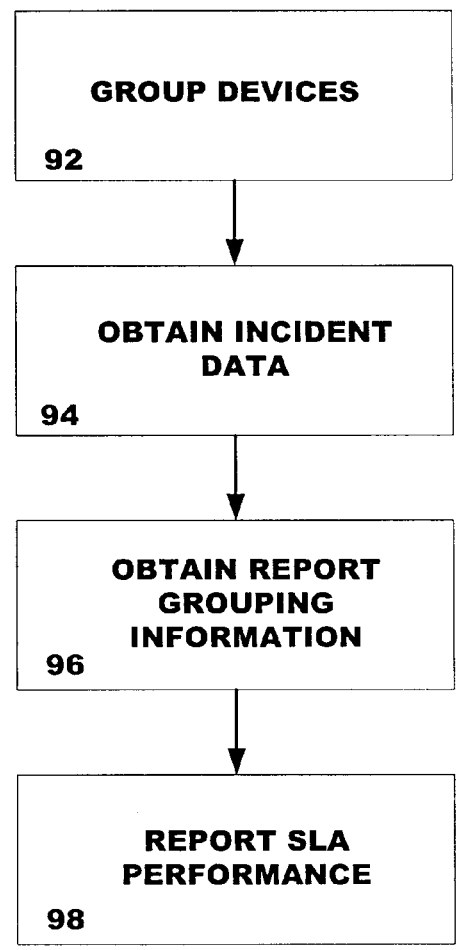
FIG. 4 is a flow chart showing a process for identifying under-performing vendors or key operators according to an illustrative embodiment of the present application.

Referring to FIG. 4, another illustrative embodiment of the present application is described. A method for managing the service and maintenance of business machines is described. For example, the system mitigates downtime of business machines such as output devices within a localized site, campus, or enterprise environment. The Asset Management (FAM) software system maintains all aspects of vendor, contract, and service incident management related to the life cycle of the asset. Individual incidents are recorded within the system database and categorized. Based on pre-defined vendor and contract associations, appropriate service providers can be selected through an Add Incident wizard. Additional events and milestones can be logged for each open incident. Specific Service Level Agreement (SLA) milestones are recorded. Escalation processes for categories of incidents are defined and enforced through the GUI.

Utilizing the incident data, hours of operation, and the contracted vendor response time and resolution time, the system displays and trends output device downtime and uptime. This information is aggregated with previously defined periodic charge information to present a total cost of ownership and trend of overall device utilization.

The system provides reports for the identification and trending service-related issues to specific devices, devices grouped by model type, devices grouped by physical location data or devices grouped by organizational data.

The system provides reports that chart device downtime/uptime vs. device utilization data. The system also provides reports that identify under-performing devices. Furthermore, the system provides reports for management, trending and analysis of incident escalation processes. The system provides for efficient management of vendors and contracts.

Referring to FIG. 4, the process 90 begins. In step 92, the process assigns a contract to a group of devices, the contract having parameters including SLA parameters. In step 94, the process obtains incident data. In step 96, device report grouping information is obtained and in step 98, the process reports performance analysis.

Figure 5:
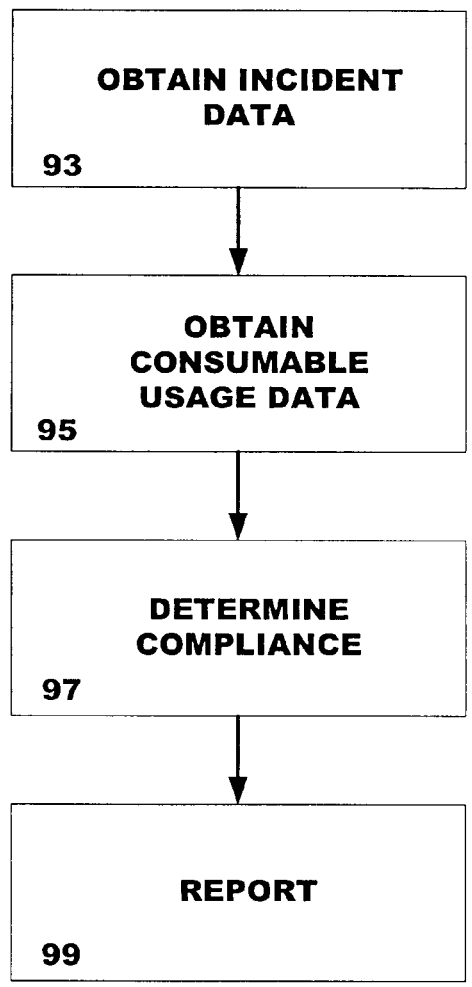
FIG. 5 is a flow chart showing a process for identifying under-performing vendors or key operators according to an illustrative embodiment of the present application.

Referring to FIG. 5, a flow chart showing a process for identifying under-performing vendors or key operators according to an illustrative embodiment of the present application. A method to manage vendor and key operator response and resolution effectiveness is described.

The Asset Management system maintains all aspects of vendor, contract, and service incident management related to the life cycle of the asset. Vendors and service providers can be associated to a group or a single asset. Additionally, service-level contracts associate groups of assets with a specific vendor. Key Operators are specific individuals defined within the system that are associated with assets. The key operators perform routine maintenance, such as clearing jams, adding paper, or changing toner. A series of Service Level Agreement (SLA) metrics can be associated to both vendors and key operators.

The system manages the interaction of both vendor service providers and key operators through the Incident Module. The system provides analysis of the vendor and key operator response and resolution effectiveness.

The system provides for identification, trending, and prediction of vendor or key operator effectiveness and provides efficient management of vendors and key operators. Furthermore, the system provides for identification of under-performing vendors or key operators. The key operator reports may be run for a period of time and may even be run across customer sites.

Referring to FIG. 5, the process 91 begins. In step 93, the process obtains incident data, the incident data including vendor or key operator data and SLA compliance parameters. In step 95, the process obtains incident SLA requirements data. In step 97, SLA report grouping information is obtained and in step 99, the process reports performance analysis. Accordingly, the system can isolate a particular key operator across all the devices and ignore incident data from a device involving another key operator.

In an embodiment, the Asset Manger System provides a comprehensive Asset tracking, accounting and full life cycle management system.

In one embodiment, the system provides a method to determine and trend the Total Cost of Ownership (TCO) of Output Devices within a Localized Site, Campus, or Enterprise Environment. The Asset Management system maintains a database of the specific output devices utilized by the customer. The system provides the end-user with a GUI and method to define customer-specific financial charge/cost models that will be applied to a specific or group of devices. This process uses one or a combination of methods to determine the periodic device charges including Base Charges, Straight cost-per-copy (CPC), Volume banded cost-per-copy, and Base Charge with Overage.

The system provides a method to record individual or bulk device meter read data, and miscellaneous adjustments that can be the result of service calls or credits. The Monthly Extract feature records or archives the usage and billing data in the system on a regular basis. The archive is based on a monthly billing period and is finalized on the last calendar day of each month. Accordingly, if changes are made to any of the asset or product attributes that affect accounting or billing, the data from previous billing periods will not be affected. Meter read history is preserved in the monthly extract. This allows the application to calculate usage by subtracting the previous meter read from the current meter read and applying any adjustments. Then the actual usage can be used to calculate costs or for testing various cost structure scenarios.

In addition to the usage data maintained within the Monthly Extract, costs associated with additional contractual obligations or service incidents are maintained. This data is combined to provide a total cost of ownership for the output device. Costs are then allocated to charge-back methods defined within the departmental/organization hierarchy of the system.

By coupling usage billing models and adjustments with contractual obligations and discrete service incidents, the total cost of ownership of the output device can be obtained. Reports can be generated that explore all kinds of cost structures and pricing schedules so that billing can be adjusted.

Additionally, a method to maintain and allocate output device usage costs within a hierarchical organizational structure is described. The Asset Management system maintains a database of the specific output devices utilized by the customer. The system provides the end-user with a GUI and method to define customer-specific financial charge/cost models that will be applied to a specific or group of devices. The system provides a method to maintain the customer's departmental/organizational structure and internal allocation and charge-back methods. The system uses this information to create a hierarchical view of the customer's physical and departmental organization at the site, campus, and enterprise levels.

The system provides a method to record individual or bulk device meter read data, and miscellaneous adjustments that can be the result of service calls or credits. The Monthly Extract is a feature of the Asset Manager application that records or archives the usage and billing data in the system on a regular basis. The archive is based on a monthly billing period and is finalized on the last calendar day of each month. This way if changes are made to any of the asset or product attributes that affect accounting or billing, the data from previous billing periods will not be affected. Meter read history is preserved in the monthly extract. This allows the application to calculate usage by subtracting the previous meter read from the current meter read and applying any adjustments. Then the actual usage can be used to calculate costs or for testing various cost structure scenarios.

In addition to the usage data maintained within the Monthly Extract, costs associated to additional contractual obligations or service incidents are maintained. This data is combined to provide a total cost of ownership for the output device. Costs are then allocated to charge-back methods defined within the systems departmental/organization hierarchy. Accordingly, the system provides for accurate charge-backs that can be allocated and apportioned to a hierarchical departmental/organizational structure. Furthermore, the system provides for historical charge-backs that are maintained as the organization structure is modified.

Additionally, a method to determine and optimize output device placement within a localized site, campus, or enterprise environment is described.

The Asset Management software system maintains a database of the specific output devices utilized by the customer, along with various financial models and contracts used to calculate cost of ownership of the device. The system maintains output device life-cycle information, including usage statistics, downtime, device speed (pages per minute), etc. The system tracks historical device mean and peak usages. The system provides a method to maintain physical information including hours of operation, device users, etc. The system provides a method to maintain the customer's departmental/organizational structure and internal allocation and charge-back methods. The system uses this information to create a hierarchical view of the customer's physical and departmental organization at the site, campus, and enterprise levels.

By combining the customer's historical usage statistics and life cycle information with the total cost of ownership of the output devices, the system determines the optimum physical placement of output devices within the customer's sites, campuses, and enterprise. The system combines the optimum physical placement of output devices with the customer's departmental and/or organizational usage statistics to further refine the placement of the devices relative to the customer's internal allocation and charge-back mechanisms.

Accordingly, the system provides for a reduction in output devices within the customer's sites, campuses, and enterprise, thereby reducing cost. Furthermore, the system allows for identification of peak utilization physical areas and departments and/or organizations, and thereby allows optimization of the placement of high-end, high-performance devices. Additionally, the system provides for ensuring the optimum utilization of high-cost output devices.

Additionally, a method for determining optimum output device replacement within a localized site, campus, or enterprise environment. The Asset Management software system maintains a database of the specific output devices utilized by the customer. The system provides the end-user with a GUI and method to define customer-specific financial charge/cost models that will be applied to a specific or group of devices.

The system provides a method to record individual or bulk device meter read data, and miscellaneous adjustments that can be the result of service calls or credits. The Monthly Extract is a feature of the Asset Manager application that records or archives the usage and billing data in the system on a regular basis. The archive is based on a monthly billing period and is finalized on the last calendar day of each month. This way if changes are made to any of the asset or product attributes that affect accounting or billing, the data from previous billing periods will not be affected. Meter read history is preserved in the monthly extract. This allows the application to calculate usage by subtracting the previous meter read from the current meter read and applying any adjustments.

The FAM system provides a method to assign primary replacement models for output devices. The primary replacement model can have alternate billing methods applied to it.

The system provides a series or reports that compares the trend and costs associated with the existing output device to the primary replacement.

The system provides for identification, trending, and prediction of alternate output devices or cost models. It provides for efficient management of existing device contracts. It also provides for identification of under-utilized or over-charged devices, and therefore candidates for replacement.

In an embodiment, the Asset Manager System provides for accounting for the movement of an asset physically and/or financially.

In another option, the asset is assigned a location including a postal Zip code. The zip code is used to determine tax information that is then exported to an accounting system. The tax information may include tax rates based upon the zip code.

In an embodiment, the system includes business rules, methods, Monthly Extract processes, and related reports that provide for reporting varieties of cost structures for output device contracts, the assignment of billing structures directly to assets or through product/model inheritance, and reports that display cost structures and billing, and reports that identify and trend replacement candidates. For example, a lease may be expired in three months and a customer might want a what-if report comparing and contrasting replacement options with the current model. Alternatively, the current model is not included.

In one detailed report, the asset manager Monthly Extract Processes are utilized to model cost structures and replacement candidates. The Asset manager utilizes Billing Components and Cost Structures that enable the end-users to combine any or all of the following billing components into a cost structure that can be assigned to a single output device asset, or to a product/model family as shown below in Table 1.

TABLE 1

| | |
|---|---|
| 1 | Period Start Date and End Date |
| 2 | Proration Information |
| 3 | Base Cost per Asset/Model |
| 4 | Periodic Charges per Asset/Model |
| 4a | Description of Periodic Charge |
| 4b | Charge Totals |
| 5 | Miscellaneous Charges per Asset |
| 5a | Description of Miscellaneuos Charge |
| 5b | Charge Totals |
| 6 | Volume/Usage Charges per Asset, either |
| 6ai | Straight Cost-Per-Copy (CPC) |
| 6ai | Begin Meter Read |
| 6aii | End Meter Read |
| 6aiii | Adjustment |
| 6aiv | Cost-Per-Copy Charge |
| 6b | Volume Banding (a.k.a. Overage) |
| 6bi | Begin Meter Read |
| 6bii | End Meter Read |
| 6biii | Volume Band Used |
| 6biv | Volume Band Tier Level Descriptions, Charges |
| 7 | Tax Rate |
| 7a | Zip Code or Cost Center |
| 7b | Tax Rate |

Figure 6:
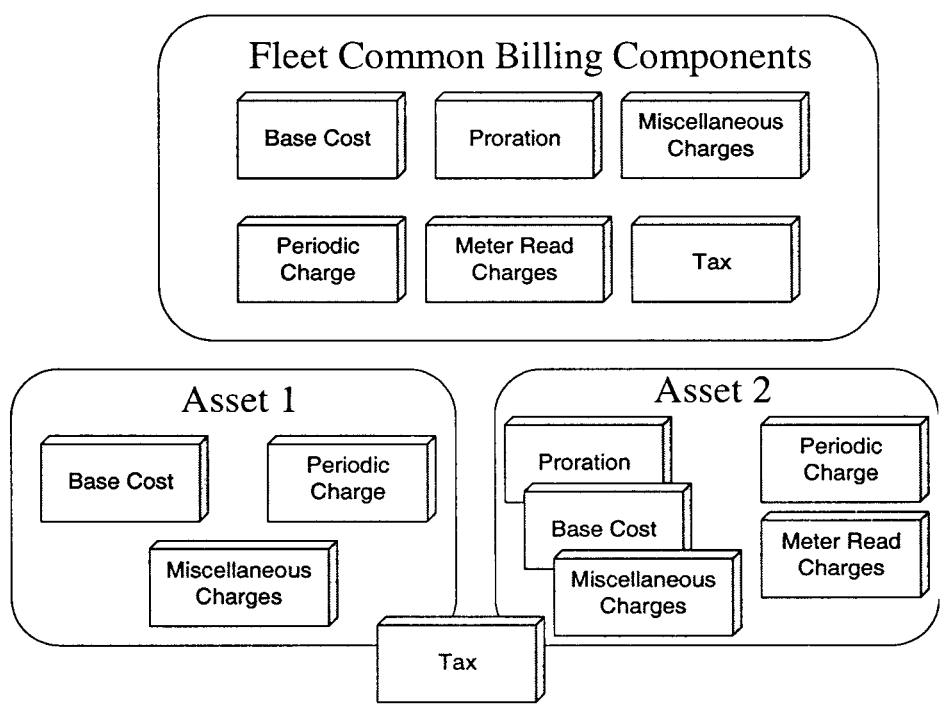
FIG. 6 is a block diagram showing a mixed billing structure according to an illustrative embodiment of the present application.

Referring to FIG. 6, a Mixed Billing Structure is shown as the Most Common Asset Manager Configuration.

As illustrated, assets within the fleet may use all, many, or a single billing component.

The system may use a Base Cost/Rate per Asset/Model. The Base Cost/Rate is the periodic (usually monthly) cost to rent or lease a device. Depending on the vendor contract, various types of service or consumables may be included within the Base Cost. Various brand/model families, asset groups, or discrete assets will have unique Base Costs/Rates.

The system may use Periodic Charges per Asset/Model. Several of the Asset Manager implementations charge the customer for specific asset services other than basic base or volume/usage charges. These charges are scheduled and included with every period's bill, and therefore have been labeled "Periodic Charges". The following list details typical Periodic Charges: Key Operator Charge, Service/Maintenance Charge and Facility Charge.

The system may use a Period Start Date and End Date. The period "start date" and "end date" are analogous with a "standard billing period" or "books are closed date". The period is usually based on the calendar month, where the start and end dates are the first and last days of the month respectively.

The system may use a Proration Variable. The term prorate is used to mean the "act of dividing or accessing proportionally". With PBMS Fleet/Asset Management, proration refers to the periodic charges (i.e. Base Charge/Rate, other periodic charges) of the asset divided by the days-in-period for which the asset was installed and servicing the customer. The most common scenario of proration encountered by fleet accounts is when an asset is installed on the last day of the month, and the provider does not wish to over-charge the customer for the full period's base rate, and only charge the customer for that single day in the period. The same scenario exists when a device is removed/replaced during the period.

Therefore, a full accounting of the Asset Manager (AM) billing information will not be expected from the system until the calendar month has completed, and the actual days the asset was in service can be calculated. Using this definition, we utilized the AM Proration Variable as a ratio of days-in-service to total-days-in-period to calculate the appropriate periodic charges for each asset, as follows in equation 1.

| Equation 1 | |
| --- | --- |
| Days Asset in Service = | Days Between (period Start Date) and (period End Date) |
| Proration Variable = | (Days Asset in Service)/(Days in Period) |
| Base Rate and Periodic Charges = | (Proration Variable) * (Base Rate + Periodic Charges) |

In the following proration example shown in Table 2, an asset was installed on the December 15, and therefore should only be charged for 16 days.

TABLE 2

| Period Start Date | Dec. 01, 2002 | |
| --- | --- | --- |
| Period End Date | Dec. 31, 2002 | |
| Days in Period | 31 | |
| Install Date | Dec. 15, 2002 | 16 days in service |
| Proration Variable | 16/31 | 0.52 |
| Base Rate | $325.00 | |
| Other Periodic Charges (Key op) | &60.00 | |
| Base Rate and Periodic Charges | (0.52) * (325.00 + 60.00) | |
| Total Prorated Base and Periodic | $200.20 | |

During the asset life-cycle, the asset may undergo several unscheduled or miscellaneous activities require debits or credits to be added to the customer's bill. FAM manages a history of these "miscellaneous charges". The following list details typical miscellaneous charges: Accessory installation, Asset Removal or Movement and Malicious damage not covered in Service/Maintenance Charge.

AM supports two methods to compute the charges for volumes/usages derived from asset meter reads: Straight Cost-Per-Copy (CPC) and Volume Banding (a.k.a. Overage).

With the Straight Cost-Per-Copy (CPC) model, each device brand/model or specific asset may have a different CPC as shown in Equation 2.

| Equation 2 | |
| --- | --- |
| Equation 2 | |
| CPC/CPI Volume/ Actual Usage = | (Current End Meter Read − Begin Meter Read) + Adjustment |

An adjustment is used to augment the volume calculation for miscellaneous click credits/debits. For example, an installation or service incident for an asset required 100 test pages to be generated. If a Service Contract is in place, the FAM Administrator may not wish to charge the customer for these 100 test pages. In this case, the FAM Administrator would log a negative adjustment (credit) that would reduce the volume/actual usage charges to the customer. A detailed example of Straight CPC with a credit (negative adjustment) is shown in Table 3.

TABLE 3

| CPP for HP 8050 | 0.015 |
| --- | --- |
| Begin Meter Read | 100500 |
| End Meter Read | 101000 |
| Adjustement | −100 |
| CPP Volume/ Actual Usage | (Current End Meter − Begin Meter) + Adjustment |
| CPP Charge | (Volume/Actual Usage) * CPP |

Volume Banding (VB) is also referred to as "Tiered Pricing" or "Overage Pricing". A method of pricing that associates a specific cost-per-copy with each of a set of volume ranges for a device or group of devices . . . . These fields will be repeated for each Model to define as many bands as required For example, a group of Tiers is shown in Table 4.

TABLE 4

| Tier | Volume in Tier | CPP |
| --- | --- | --- |
| Tier 1 | 1-14999 cpm | 0.021 pp |
| Tier 2 | 15000-24999 cpm | 0.019 pp |
| Tier 3 | 25000-100,000,000 cpm | 0.017 pp |

With specific assets or Brand/Models that have a base cost which includes a specific number of clicks per month, Volume Banding is configured to calculate the "Overage" volume charges. In these scenarios, the initial tier (Tier 1) is assigned a cost of zero. In the following configuration example shown in Table 5, the first 14,999 clicks are included with the Base Cost/Rate, and therefore have a charge of zero.

TABLE 5

| Tier | Volume in Tier | CPP |
| --- | --- | --- |
| Tier 1 | 1-14,999 cpm | 0.00 pp |
| Tier 2 | 15,000-24,999 cpm | 0.019 pp |
| Tier 3 | 25,000-100,000,000 cpm | 0.017 pp |

The use of Adjustments with assets designated with Volume Bands pose a challenge to the FAM administrator, for the FAM administrator may add an adjustment that traverses a tier boundary, and therefore may inadvertently over- or under-charge the customer. Therefore, the FAM Administrator uses Miscellaneous credits/debits to mark adjustments with assets assigned to Volume Bands.

After all of the asset charges have been calculated, the proper service/sales tax must be applied to the sub-total. Tax rates are based on zip/postal codes and applied to the bill.

Therefore, AM maintains a table of zip codes and corresponding tax rates. During the AM Monthly Extract process, where the billing components for the system are calculated and closed, the tax rate is determined by querying the physical location of the asset, returning the zip code, then obtaining the tax rate for this zip code. The tax rates can be updated at anytime through the FAM Tax Bulk Import Utility.

The following provides four examples of typical asset charges within a billing period. The Base Cost/Rate and CPP/Volume Band costs are arbitrary numbers that illustrate the billing process, and do not reflect the actual PBMS charges. These examples shown in Table 6 illustrate how different assets within a fleet may incur different types of charges, the least of which is the result of a meter read volume calculation.

TABLE 6

|  | Example 1 | Example 2 | Example 3 | Example 4 |
|---|---|---|---|---|
| Asset Tag | 111111 | 111112 | 111113 | 111114 |
| Brand | HP | Canon | Lexmark | HP |
| Model | 8150 | IR550 | C2100 | 4150 |
| Period Start Date | Dec. 1, 2002 | Dec. 1, 2002 | Dec. 1, 2002 | Dec. 1, 2002 |
| Period End Date | Dec. 31, 2002 | Dec. 31, 2002 | Dec. 31, 2002 | Dec. 31, 2002 |
| Install Date | Dec. 10, 2002 | Nov. 1, 2001 | Jan. 10, 2002 | Dec. 10, 2002 |
| Removal Date | Dec. 15, 2002 | | | |
| Proration Variable | 0.677 | 0.483 | 1.000 | 0.645 |
| Base Cost | 175.00 | 325.00 | 245.00 | 150.00 |
| Periodic Charge | 60.00 | 60.00 | 25.00 | 25.00 |
| Miscellaneous Charge Desc | Click Credit | NA | NA | Uncontracted Move/Reinstall |
| Miscellaneous Charge | 50.00 | 0.00 | 0.00 | 125.00 |
| Meter Charge Method | VB HP 8150 | VB Canon IR550 | CPC $0.015 | CPC $0.025 |
| Begin Meter Read | 100,500 | 100,500 | 100,500 | 100,500 |
| End Meter Read | 101,000 | 101,000 | 101,000 | 101,000 |
| Adjustment | NA | NA | −25 | 0 |
| Billable Volume | 500 | 500 | 475 | 500 |
| Meter Charge Subtotal | 5.30000 | 0.00000 | 7.12500 | 12.50000 |
| SubTotal Charges | 290.30000 | 385.00000 | 277.12500 | 312.50000 |
| Tax Rate | 0.0200 | 0.0373 | 0.0000 | 0.0410 |
| SubTotal Tax | 5.80600 | 14.36050 | 0.00000 | 12.81250 |
| Grand Total Charges | $296.10600 | $399.36050 | $277.12500 | $325.31250 |

As shown in Table 7, a volume band for a particular asset, the HP 8150 is described.

TABLE 7

| Tier | Volume in Tier | CPP |
|---|---|---|
| Tier 1 | 1-200 copies per month | $0.00 per page |
| Tier 2 | 201-300 pages per month | $0.019 per page |
| Tier 3 | 301-100,000,000 pages per month | $0.017 per page |

As shown in Table 8, a volume band for a particular asset, the CANON IR550 is described.

TABLE 8

| Tier | Volume in Tier | CPP |
|---|---|---|
| Tier 1 | 1-14,999 copies per month | $0.00 per page |
| Tier 2 | 15,000-24,999 copies per month | $0.019 per page |
| Tier 3 | 25,000-500,000,000 copies per month | $0.017 per page |

This section presents an overview of the methods that the end-user performs in AM to create and assign billing structures directly to assets or through product/model inheritance. As detailed in Section 3 of Appendix 0001-2, Managing People & Places, the end-user adds or modifies the following data: Location hierarchy, Organizational hierarchy and Employees.

The AM Expanded Import provides bulk import, and will build the hierarchical data automatically. The end-user adds or modifies the following data: Brands, Product Types and Product Families. The end-user adds or modifies the following data shown in Table 9.

Table 9 is shown below.

TABLE 9

| | |
|---|---|
| a | The user creates necessary Volume Bands and Tiers through the GUI. The volume band unique names will usually contain related Contractual numbers or identifiers. |
| b | Product Families that will have common Volume Bands are assigned through the GUI. This enables assets to automatically inherit the Volume Band billing characteristics. This can be over-ridden at the asset level. |
| c | Product Families that will have common Base Costs are assigned through the GUI. This enables assets to automatically inherit the Base Cost billing characteristics. This can be over-ridden at the asset level. |
| d | Product Families that will have common Straight Cost-Per-Copy assigned through the GUI. This enables assets to automatically inherit the CPC characteristics. This can be over-ridden at |

TABLE 9-continued

| | |
|---|---|
| | the asset level. |
| e | Product Families that will have common Periodic Charges are assigned at the database level. This enables assets to automatically inherit the charge characteristics. This can be over-ridden at the asset level through similar database-level changes. |
| f | The end-user performs the following: Selects specific products to be the Replacement Candidates for existing models. These replacement candidates can be a similar or dissimilar brand/model. Additionally, similar models can be created with different cost structures (i.e. Volume Banding, Base Costs, CPC, etc.) and assigned to the model as a Replacement Candidate. |
| g | The underlying FAM business logic will automatically determine the Primary Replacement Candidate, by evaluating the lowest cost structure, speed (page-per-minute), and capacity. |
| h | Adds assets to the system manually or through the FAM Expanded Import utility. |
| i | Assets inherit any cost structures defined during the previous "Managing Products" steps. |
| j | If required, over-ride the CPC, Volume Bands, and/or Base Cost of the asset. |

The end-users of the FAM system populate the system with meter read information and other historical information. The system automatically archives the historical billing information and other related asset information.

The system is then able to pull together the data to explore alternate cost structures and device replacement candidates. After a reasonable amount of time (three to six periods), the AM system will contain enough device utilization data to provide accurate trending and analysis. Additionally, alternate billing structures and replacement candidates can be compared to the gathered data. This section details how these AM analysis tools can be exploited to provide unique perspectives, increased margins, or customer cost savings.

Figures 7, 8:
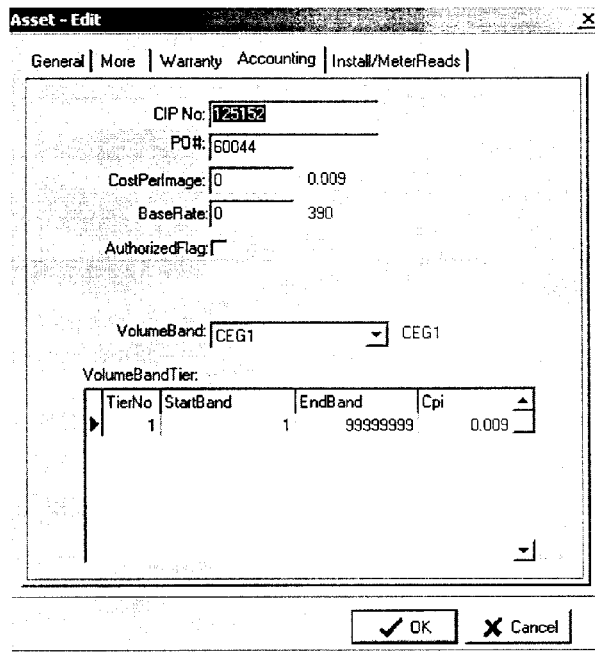

Referring to FIG. 7, Alternate Asset Billing Structures or Scenarios are shown. Since the Monthly Extract process historically records the billing structure and data for the device fleet, the end-user can view alternate billing scenarios or structures by performing several steps. First, the user Selects the asset in the FAM main window. Next, the user Right-clicks the asset, and selects Edit. Finally, the user Selects the Accounting tab. The inherited cost values will be noted in green. In the example asset below, the inherited CostPerImage is $0.009, inherited BaseRate is $0.010, and the inherited VolumeBand is the predefined CEG1 Volume Band, which also has a single-tier click rate of $0.009.

Referring to FIG. 8, if we click on the Accounting detail tab within the application, we note resulting March 2003 period charges based on the existing cost structure.

Figures 9, 10:
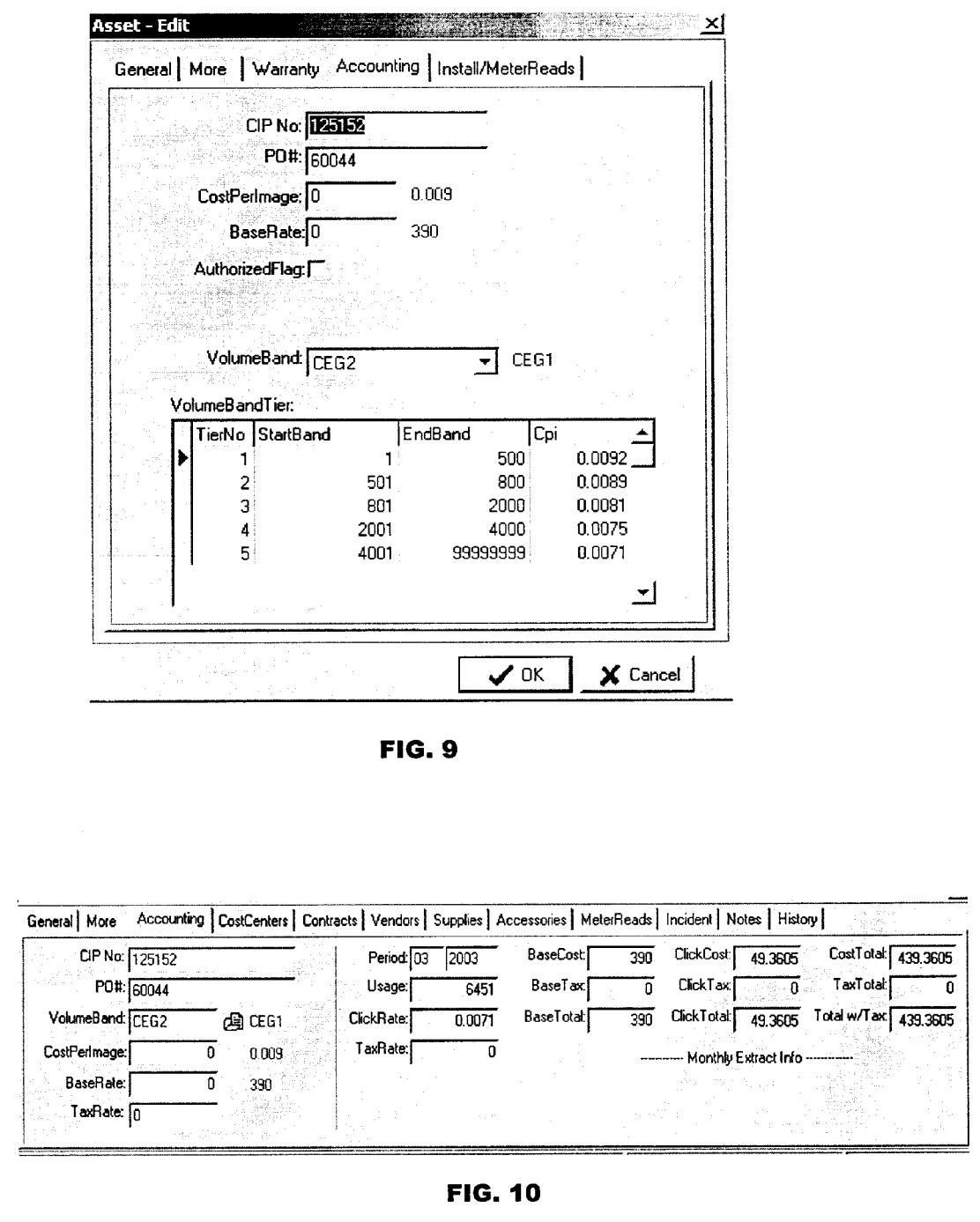

Referring to FIG. 9, to try out other billing structures or pre-defined Volume Band structures, select the asset again, then change the applicable fields within the Accounting tab. In our example, we will change the Volume Band to CEG2, which has a granular multi-tiered pricing structure of FIG. 9 Referring to FIG. 10, in our example, if we re-apply the extract processes, we could now see the subtle differences in costs associated with the alternate Volume Banding structure. Also, the ClickRate field now displays the last Volume Band tier-level rate that was applied (e.g. Tier 5, $0.0071).

Referring to FIG. 11, a method of evaluating asset replacement candidates and scenarios is described. As detailed in the previous sections, alternate devices or preferred replacement models for assets can be assigned through the "Manage Products" module. This enables the end-user to assign replacement candidates for assets that may be up for renewal, or evaluate alternate model choices when optimizing the fleet. There are three standard reports that are used in this process, and can be run at any time by AM users. The report snippet below is from the "Assets Compared to Preferred Replacement" report. This report provides a list of all parent assets and their respective volumes for a specified period of time. The base cost and click cost for the asset are compared to the costs of the preferred replacement model, and potential savings are noted.

The Assets Expiring within N# Days Compared to Preferred Replacement report provides a list of all parent assets and their respective volumes for a specified period of time. The base cost and click cost for the asset are compared to the costs of the preferred replacement model, and potential savings are noted.

The Replaced Assets and 12-month Volume report provides a list of all parent assets and their respective volumes for a specified period of time. The base cost and click cost for the asset are compared to the costs of the preferred replacement model, and potential savings are noted.

The embodiments are illustrative and not intended to present an exhaustive list of possible configurations. Where alternative elements are described, they are understood to fully describe alternative embodiments without repeating common elements whether or not expressly stated to so relate. Similarly, alternatives described for elements used in more than one embodiment are understood to describe alternative embodiments for each of the described embodiments having that element.

The described embodiments are illustrative and the above description may indicate to those skilled in the art additional ways in which the principles of this invention may be used without departing from the spirit of the invention. Accordingly, the scope of each of the claims is not to be limited by the particular embodiments described.

The invention claimed is:

1. A computer implemented method for providing asset physical placement analysis for an organization for a plurality of assets using a computer server and a database connected to the plurality of assets using a communications network for an organization comprising:

obtaining historical asset usage data from the database using the computer server over a plurality of periods received from the plurality of assets using the communications network;

obtaining asset physical placement data associated with the plurality of assets over the plurality of periods using the computer server;

determining suggested alternate asset physical placement data using the asset usage data and the asset physical placement data using the computer server; and providing the suggested alternate asset physical placement data using the computer server, further comprising:

determining hierarchal usage data using the asset physical placement data organized in a hierarchy including room number data; and providing the hierarchal usage data.

2. A computer implemented method for providing asset physical placement analysis for an organization for a plurality of assets using a computer server and a database connected to the plurality of assets using a communications network for an organization comprising:

obtaining historical asset usage data from the database using the computer server over a plurality of periods received from the plurality of assets using the communications network;

obtaining asset physical placement data associated with the plurality of assets over the plurality of periods using the computer server;

determining suggested alternate asset physical placement data using the asset usage data and the asset physical placement data using the computer server;

providing the suggested alternate asset physical placement data using the computer server;

obtaining organization department physical location data;

obtaining historical asset usage data over a plurality of periods for a plurality of assets, wherein the historical usage data is associated with the organization physical location data;

determining suggested alternate asset physical placement data using the asset usage data, the asset physical placement data and the organization department physical location data;

providing asset usage data organized by department physical location; and providing the suggested alternate asset physical placement data, further comprising:

determining hierarchal usage data using the organization department physical location data organized in a hierarchy including room number data; and providing the hierarchal usage data.

* * * * *